Feb. 26, 1957 J. C. BLOOM ET AL 2,783,068

PACKING RING

Filed Sept. 16, 1952

INVENTOR.
JOHN C. BLOOM AND
HARRY E. CORNISH
By Edwin Coates
-ATTORNEY-

United States Patent Office 2,783,068
Patented Feb. 26, 1957

2,783,068

PACKING RING

John C. Bloom and Harry Ewing Cornish, Los Angeles, Calif., assignors to Douglas Aircraft Company, Inc., Santa Monica, Calif.

Application September 16, 1952, Serial No. 309,830

1 Claim. (Cl. 286—26)

This invention relates to packing rings of the compressible, resilient-elastic type.

The conventional ring of this type, known as the "O-ring," is prone to failure from internal stresses set up by two principal influences. The first of these influences arises at the time of applying the ring to its seat in the mechanism to be packed. In so doing, the ring is stretched to fit around the one of the two cylindrical, relatively movable parts to be packed, this movable part bearing the groove for the ring. The ring is then rolled into place in the groove. Unless, and even when, great care is exercised to assure that the ring is rolled evenly around its entire periphery, the ring twists locally, undergoing a considerable number and amount of spiral stresses, which soon lead to failure of the ring in service.

The other influence occurs either at the time of assembling the other relatively movable cylindrical part onto the part bearing the ring or during the operation of the equipment. At either time, the ring may be locally "oscillated," or twisted unequally in different locations thereof.

These internal stresses produce "spiral failures" of the ring or at least prevent the ring from fitting and bearing properly and sealingly on the packed surface and in its seating groove. They also so deform it that it will not slide properly in the groove.

With the conventional O-ring type of packing member, the arcuate portions thereof lying adjacent to the radial gap between the movable members of the mechanism undergo so-called "chewing" and eventually lose all power to seal the jointure. This "chewing" is resultant upon the O-ring's adjacent portions being extruded into said radial gap wherefore pieces of it are sheared off each time the movable parts reciprocate.

The present packing ring overcomes these and other deficiencies of the conventional rings, particularly the O-ring. In so doing, it incorporates positive means for preventing the ring-body from undergoing "spiral deformation" or twisting about the circularly extending axis passing through the center of the radial cross-section of the ring. These means prevent spiral deformation when the ring is being applied, or slid, down the cylindrical surface of its seat; prevent the ring from being twisted at the time of assembling the one of the two movable parts concentrically over the other; and obviates twisting during the reciprocation of these movable parts.

The novel ring also obviates "chewing" by extrusion since the sealing surfaces remain spaced away from the radial gap into which the ring would otherwise be extruded and damaged in the case of the ordinary type of ring.

To achieve these and other ends, the novel packing member essentially comprises an "endless," that is, jointless, annulus composed of a compressible, elastically deformable material, the annulus having a substantially triangular shape in cross-section, the maximum width of this section in the direction of the longitudinal axis of the jointure being less than that of the groove in the same direction. The maximum width of the cross-section in the direction perpendicular to the movable members is less than its maximum width parallel to the axis of movement of the movable members, so as to provide a surface in contact with the groove's bottom that acts as an abutment for neutralizing twisting forces applied to the apex of the ring.

Preferably, the ratio of the width of the base of the ring to the maximum dimension radially of the packed jointure, is maintained, regardless of the overall size of the ring, at a ratio of the order of about .56, or thereabouts. This low ratio of the "altitude" of the triangular cross-section to the base thereof minimizes the moment arm of the ring that extends radially of the groove and provides a relatively wide base against which the ring-rolling forces are neutralized in each rolling-direction. Concurrently, the ratio of the altitude of the triangle to the depth of the groove is such as to provide a certain amount of initial protrusion of the ring's apex-portion into the path of movement of the movable members of the mechanism so as to effect a sealing contact thereof with the surface to be packed.

The angle of slope of the planeal portions of the sides of the "rounded-triangular" cross-section with reference to the base is maintained as small as feasible without increasing the length of the contact-line between the radially compressed ring and the working surface this line contacts, since increasing this angle of slope would render it more difficult to install the movable member of the mechanism around the other member thereof that bears the ring and would also result in undesirably decreasing the radius of the rounded base-edges of the section to the point where the ring would be laterally unstable under rolling moments applied thereto. In addition, such increase would cause more severe deformation of the ring when the latter is radially pressurized, thus reducing the life of the ring.

In one of its more specific forms, the packing member has a substantially triangular section with all its corners rounded off and the apex lies in contact with the working surface to be sealed, the base tightly fitting the bottom of the groove, allowing sliding, instead of rolling, contact with the moving member.

The radius of each of the rounded base corners is, in all overall sizes of the ring, maintained large enough to leave a space between each corner and the adjacent side of the groove when the elastomer swells on contact with the hydraulic fluid, so that on occurrence of such swelling, the ring will not completely fill the groove and thereby be immobilized.

The radius of the rounded apex is such as to enable tight contact with the working surface but not great enough to cause the apex to "stick."

The thickness of the ring in the direction from the apex to the base is maintained such relative to the depth of the groove as to dispose not over 10% of the radial thickness of the triangle at the apex portion thereof protruding out of the groove before assembly.

The other features and accomplishments of the invention will either be made manifest, or become apparent, hereinafter.

One of the presently preferred embodiments of the invention is, solely by way of example, illustrated in the accompanying drawing and described hereinafter in detail in conjunction therewith.

In this drawing:

Figure 1 is a fragmentary longitudinal sectional view of one of the typical environments in which a now-preferred form of the novel packing member is employed, the two relatively slidable members here being shown as the piston and the cylinder of an airplane landing leg strut or the like;

Figure 1:
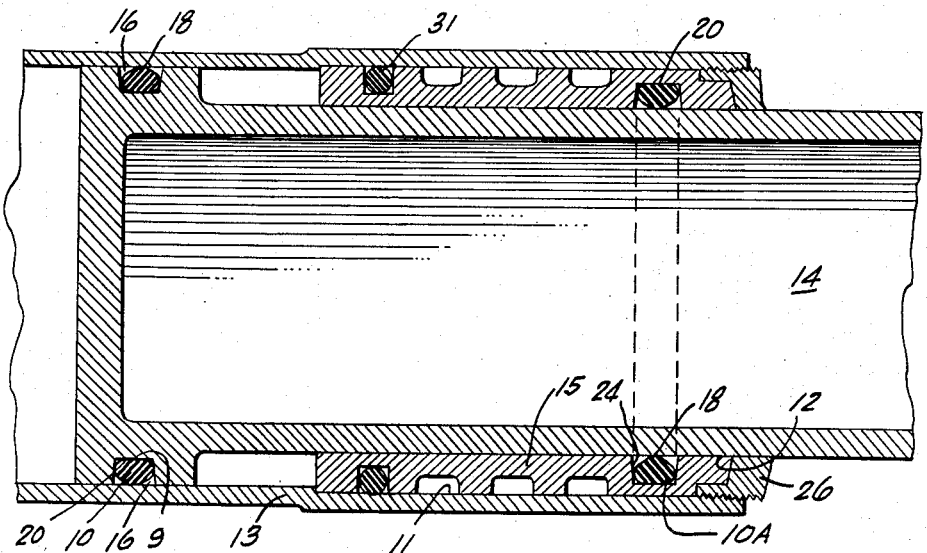
Figure 2:
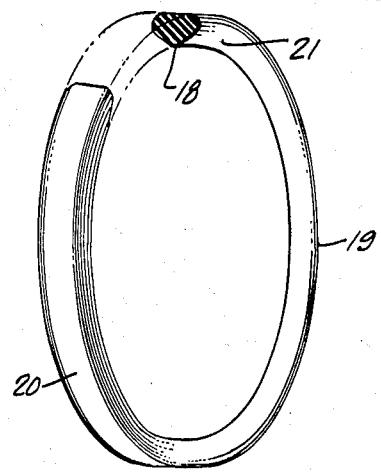
Figure 2 is a perspective view of said packing member, a portion thereof being broken away and represented by phantom lines.
Figure 3:
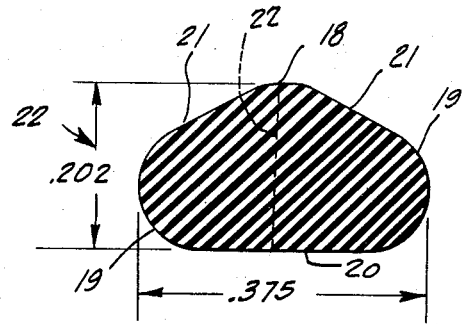
Figure 3 is a greatly enlarged cross-sectional view of the packing member at the left-hand end of Figure 1.

The invention is shown in Figure 1 as applied to a mechanism that includes a cylinder member 13, a piston member 14 and a bearing member 15. The latter is held in position against a shoulder in member 13 by a nut 26. Packing rings according to this invention, later described in detail, are provided as shown to serve as sliding seals between the members 14 and 13 and between the bearing member 15 and the piston member 14. A conventional O-ring 31 is shown as employed as a static seal to seal the bearing 15 to the cylinder 13.

In the outer cylindrical face of the leftward, or headed, end of the piston member 14 an annular groove 16 is provided and is formed for receiving and containing a packing member 10. This groove is shown as substantially trapezoidal in cross-section but may if desired be rectangular and in either case has a predetermined depth to which the radial thickness of the present ring is proportioned in all sizes thereof.

Seated in this groove 16 is an annulus 10 composed of a compressible material which is dimensionally recuperative after being deformed. Broadly speaking, resilient-elastic, oil-and-acid proof, tough and durable materials such as elastomers of the class of rubber are contemplated for use in the fabrication of this annulus. Since, contrary to the action of the O-ring type of packing member, the present ring undergoes no "kneading," synthetic elastomers other than rubber may well be employed herein.

The annulus has a cross-sectional shape that is substantially triangular with all the corners thereof rounded off, or arcuate, the radii of these arcs being as hereinafter described.

The apex 18 of the ring 10 is on the outer periphery of the ring and is disposed pointing outwardly of the groove and lies adjacent the path of relative motion of the relatively movable members, apex 18 sliding on cylindrical surface 11 and the base 20 of the triangle fitting congruently in facewise contact with the bottom wall 9 of the groove. The rounded corners 19 of the base have a radius sufficiently larger to clear the adjacent sides of the groove by an amount 30 which prevents the ring from binding in the groove when it swells under contact with hydraulic fluid.

Because of the relatively great width of the base of the triangle with respect to the "altitude" of the triangle, in fitting the ring into place and when it is stretched radially and slipped onto the piston-head, the relatively wide base 20 acts as a ring-stabilizing surface in abutment with the cylindrical bottom wall of the groove, for the altitude is such relative to the base as to provide only a relatively small moment-arm on which twisting forces can be applied. Hence, the ring can be slid onto the head without spiral deformation to any consequential extent. It is hence fitted into the groove with all radial cross-sectional planes thereof lying congruent with each other. For the same reasons, no local "humps" or compression-thickenings are formed in the ring of any size or extent that would impair its fitting either peripherally or radially into the groove in the proper manner.

When the piston member 14 is fitted into the cylinder 13 this same feature of the ratio of the dimension of the base of the ring to the altitude thereof also prevents the cylindrical member 13 from locally spirally twisting the ring around the circularly extending center-line of its radial cross-section. Since, further adequate clearance 30 can be left between the base-corners of the ring and the adjacent sides of the groove to allow slight axial movements of the ring in a direction parallel to the longitudinal axis of the relatively movable members, the assembling of such members cannot cause improper seating of the ring.

The bearing member 15 remains stationary in its place and the telescopable member 14 protracts and retracts within the cylindrical member 13 and in order to complete the packing of the cylindrical faying surfaces, the inner surface of the one end of the bearing member 15 is provided with a groove 24 in which is seated another ring 10A having essentially the same conformation, characteristics and functions as the ring previously described. However, this second ring 10A, in order to seal the outer surface 12 of the member 14 has the apex of its triangular section lying on the inner periphery of the ring in contact with surface 12 of the shock-strut. The relations of this apex to the base of the triangular section and the other relationships and ratios heretofore mentioned are the same as heretofore described.

When the relatively movable members 13 and 14 reciprocate, the working load is taken by the rings 10 and 10A, since the ring 31 merely seals the stationary bearing's outer surface to the adjacent surface of the "cylinder-member" 13. Assuming the hydraulic pressure fluid to be applied from the leftward in Figures 1 and 4, the rings 10 and 10A, in cross-section, assume the shape and position shown in solid lines in Figure 4. That is, the fluid-contacted face 25 of the ring has its upper portion 27 concaved rightwardly and the lower portion 28 of said face assumes a shape which is substantially convex leftwardly. The apex portion 18 of the ring remains in sealing contact with the surface 12 of the member 14 and the base 20 of the ring also remains in sealing contact with the bottom of the groove. The remaining face 29 of the cross-sectional outline of the ring assumes an almost arcuate shape with its medial portion in contact with the rightward side of the groove.

Figure 4:
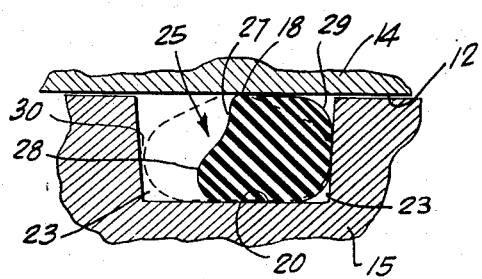
Figure 4 is an enlarged fragmentary section of the assembly shown in Figure 1, taken to show the sealing distortion of the ring against the movable member and the far wall of the groove under the action of hydraulic pressure fluid acting on it from the leftward.

"Chewing" of the ring, that is, extrusion thereof into the radial gap between the relatively movable members, with consequent shearing off of the extruded portion, is substantially obviated by the fact that, contrary to the O-ring type of packing, the inclined sides 21 of the ring lie a much greater distance from the adjacent respective radial gaps between the movable members, even when the one face 29 of the ring is occupying the position of Figure 4, than does the corresponding portion of the conventional O-ring. Moreover, the inclined planeal faces 21 of the present ring dispose most of the bulk of the ring farther away from these gaps, and closer to the center of the cross-section of the ring, than is the case in an O-ring of the same diameter.

In assuming the shape of Figure 4, the ring merely axially slides parallel to itself, undergoing no axial twisting or spiral deformation. This motion is facilitated by hydraulic fluid trapped in the spaces 23 between the lower portion of each of the rounded base-corners and the adjacent surface of the bottom of the groove.

It will be apparent that various changes and modifications may be made in the construction of the novel sealing ring without departing from the spirit of the invention, and it is intended that all such changes and modifications shall be embraced within the scope of the following claim.

We claim:

In combination, first and second relatively movable generally cylindrical members, the first member having an annular groove therein opening toward the second member, the bottom surface of said groove being cylindrical; an annular sealing member having a substantially triangular cross section, said sealing member being composed of an elastomeric material capable of being easily deformed by the action of fluid pressure thereon, said sealing member having an arcuate apex on one periphery and a base portion constituting a cylindrical surface on the other periphery, the two sides of said sealing member being inclined and converging toward said arcuate apex, each of said two sides being joined to the cylindrical surface of said base portion by a rounded portion thereby defining a space between the bottom cylindrical surface of said groove and the base portion of said sealing member adjacent each side thereof; said sealing member being mounted in said groove with the cylindrical surface of said base portion lying against the bottom cylindrical surface of said groove; the axial width of said groove being somewhat greater than that of said sealing member; said sealing member being radially compressed between said first and second members to form a seal; the radial thickness of said sealing member measured from said arcuate apex to the cylindrical surface of said base portion being less than the maximum axial width of said base portion; the maximum axial width of said base portion exceeding the distance from said apex to the cylindrical surface of said base portion by an amount sufficient to overcome the tendency of the sealing member to spirally deform upon the application of fluid pressure to one side of the groove, each of said spaces formed between the two rounded portions of said sealing member and the bottom cylindrical surface of said groove at each side of said sealing member being adapted to trap pressure fluid whereby the sealing member tends to slide axially in the groove under the influence of fluid pressure.

References Cited in the file of this patent

UNITED STATES PATENTS

| | | |
|---|---|---|
| 1,859,436 | Durdin | May 24, 1932 |
| 2,208,620 | Baisch | July 23, 1940 |
| 2,227,838 | Main | Jan. 7, 1941 |
| 2,360,731 | Smith | Oct. 17, 1944 |
| 2,444,119 | Thorn et al. | June 29, 1948 |
| 2,492,006 | Raybould | Dec. 20, 1949 |

OTHER REFERENCES

"Synthetic Rubber O-Ring Seals" (Carlotta). Published in Product Engineering, June 1951 (pages 130–135) relied on. Copy in Scientific Library and Div. 52.